(12) United States Patent
Pham

(10) Patent No.: US 6,569,004 B1
(45) Date of Patent: May 27, 2003

(54) POLISHING PAD AND METHOD OF MANUFACTURE

(75) Inventor: Xuyen Pham, Fremont, CA (US)

(73) Assignee: Lam Research, Fremont, CA (US)

( * ) Notice: Subject to any disclaimer, the term of this patent is extended or adjusted under 35 U.S.C. 154(b) by 0 days.

(21) Appl. No.: 09/476,459

(22) Filed: Dec. 30, 1999

(51) Int. Cl.⁷ .............................................. B24D 11/00
(52) U.S. Cl. ........................ 451/526; 451/548; 451/529
(58) Field of Search ................................. 451/529, 526, 451/527, 548, 531, 533

(56) References Cited

U.S. PATENT DOCUMENTS

| | | | |
|---|---|---|---|
| 3,074,789 A | | 1/1963 | Krogh |
| 3,306,718 A | | 2/1967 | Chapin |
| 4,240,855 A | | 12/1980 | Pennington |
| 4,725,567 A | * | 2/1988 | Rones ............................ 15/98 |
| 4,736,549 A | | 4/1988 | Toillie |
| 5,200,610 A | * | 4/1993 | Zuckerwar et al. .... 250/227.21 |
| 5,314,512 A | * | 5/1994 | Sexton ........................ 51/293 |
| 5,558,568 A | * | 9/1996 | Talieh et al. ................ 451/303 |
| 5,993,298 A | | 11/1999 | Duescher |
| 6,000,997 A | * | 12/1999 | Kao et al. ....................... 451/7 |
| 6,328,642 B1 | * | 12/2001 | Pant et al. ................... 451/307 |
| 6,406,576 B1 | * | 6/2002 | Benedict et al. ............ 156/137 |

FOREIGN PATENT DOCUMENTS

| | | |
|---|---|---|
| DE | 247 169 A | 7/1987 |
| EP | 0 283 550 A | 9/1988 |
| EP | 0 881 484 A | 12/1998 |

OTHER PUBLICATIONS

Patent Abstracts of Japan: Publication No. 09109033; publication date Apr. 28, 1997; application date Oct. 12, 1995; application No. 07289195.

* cited by examiner

Primary Examiner—Lee Wilson
(74) Attorney, Agent, or Firm—Brinks Hofer Gilson & Lione

(57) ABSTRACT

A method of joining sections of polishing pad for use in the chemical mechanical planarization of a semiconductor wafer. Two sections of polishing pad are positioned so that they contact one another. The two sections are then welded together to create a robust joint. The joint is resistant to infiltration of slurry and is not susceptible to delamination that commonly occurs in a typical laminate joint.

10 Claims, 3 Drawing Sheets

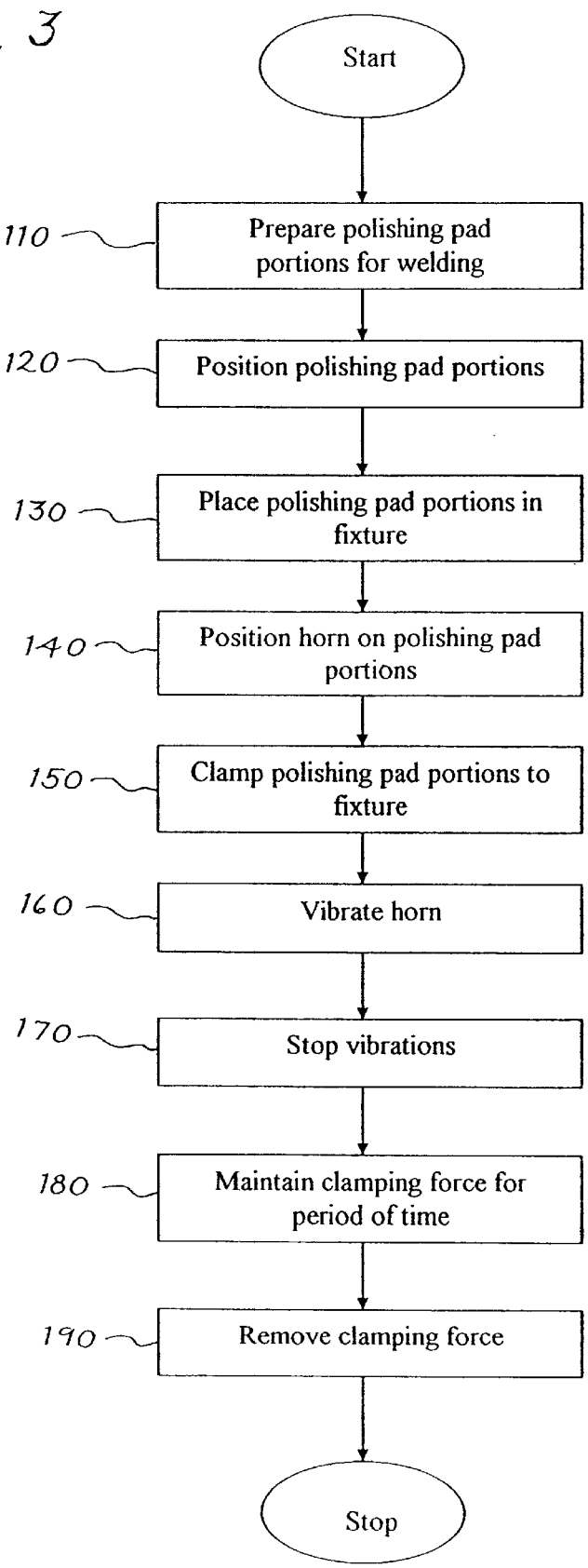

POLISHING PAD AND METHOD OF MANUFACTURE

FIELD OF THE INVENTION

The present invention relates to a polishing pad for use in chemical mechanical planarization applications. More particularly, the present invention relates to a method of joining sections of polishing pad for use in the chemical mechanical planarization or polishing of semiconductor wafers.

BACKGROUND

Semiconductor wafers are typically fabricated with multiple copies of a desired integrated circuit design that will later be separated and made into individual integrated circuit chips. A common technique for forming the circuitry on a semiconductor is photolithography. Part of the photolithography process requires that a special camera focus on the wafer to project an image of the circuit on the wafer. The ability of the camera to focus on the surface of the wafer is often adversely affected by inconsistencies or unevenness in the wafer surface. The need for a precise image projection is accentuated with the current drive toward smaller, more complex integrated circuit designs. Semiconductor wafers are also commonly constructed in layers, where a portion of a circuit is etched on a first level and conductive vias are made to connect up to the next level of the circuit. After each layer of the circuit is etched on the wafer, an oxide layer is put down that allows the vias to pass through the oxide layer while covering the rest of the previous circuit level. Each layer of the circuit can create or add unevenness to the wafer as it is constructed. These imperfections are preferably smoothed out before generating the next circuit layer.

Chemical mechanical planarization (CMP) techniques are used to planarize the raw wafer and each layer of material added thereafter. Available CMP systems, commonly called wafer polishers, often use a rotating wafer holder that brings the wafer into contact with a polishing pad that is moving in the plane of the wafer surface to be planarized. A polishing fluid, such as a chemical polishing agent or slurry containing microabrasives, is applied to the polishing pad to polish the wafer. The wafer holder then presses the wafer against the rotating polishing pad and is rotated to polish and planarize the wafer.

The polishing pads commonly used in this process include belt-type pads and rotary-type pads. A belt-type pad typically consists of one or more sections of material that are formed into a belt by laminating or bonding the sections to each other and/or to a support structure. The joining of multiple sections of material requires the formation of joints where the sections meet. In a typical joint, there is a small space left between the two sections. These joints are subject to stresses that can cause the sections to delaminate. Delamination of the sections can result in a complete failure of the joint. The failure rate of the joints is increased as the slurry used with the pad seeps into the space between the sections.

A rotary-type pad typically consists of one or more sections of material that are joined together to form a pad. The pad is attached to a rotary machine that rotates the pad to polish a wafer. The joints in this type of pad are also formed by laminating or bonding the sections to each other and/or to a support structure and also subject to the same failure as the belt type pad. A polishing pad that overcomes these deficiencies is needed.

SUMMARY

According to one aspect of the invention, a first section of polishing pad is welded to a second section of polishing pad to form a joint that is not susceptible to infiltration of a slurry and is resistant to delamination failure. The first section of polishing pad preferably overlaps the second portion of polishing pad to further increase the integrity of the joint. The combination of overlapping and welding the sections effectively seals the joint and prevents slurry from penetrating the joint. According to other aspects of the invention the sections of polishing pad can be welded in configurations where they are butted to or interlocked with one another. These configurations also effectively seal the joint and prevent slurry from penetrating the joint. Also, the sections of the polishing pad can comprise one or more portions materials or cushioning materials.

BRIEF DESCRIPTION OF THE DRAWINGS

FIG. 3 is a side view of a portion of a polishing pad of a second preferred embodiment.

DETAILED DESCRIPTION OF THE PRESENTLY PREFERRED EMBODIMENTS

By way of introduction, the preferred embodiments described below include a method of joining two sections of polishing pad for use in a chemical mechanical planarization of a semiconductor wafer. In one embodiment, the sections of polishing pad can be joined to make up a portion of a belt, while in another embodiment, the sections can be joined to make up a portion of a polishing pad for use in rotary-type polisher. The sections of polishing pad are arranged so that there is some contact between the sections. The two sections are welded together at the contacting areas to form a joint that resists slurry infiltration and is more robust than a common laminated joint.

Figure 1:
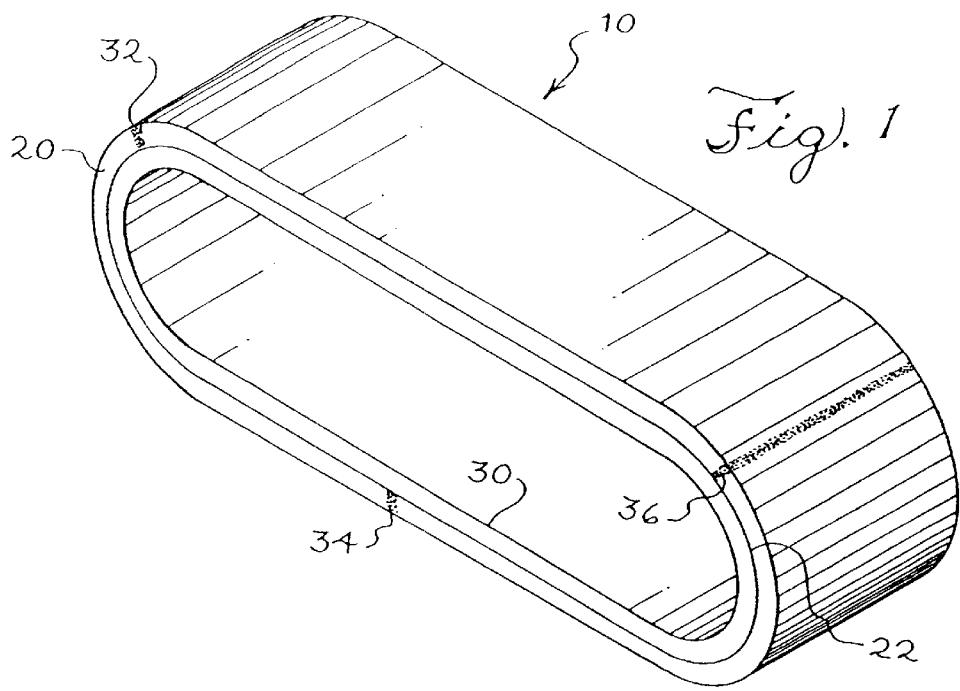
FIG. 1 is a side view of a polishing pad of a first preferred embodiment.

By way of example, FIG. 1 depicts a stacked pad polishing belt 10 of a first embodiment. The stacked pad 10 comprises first, second, and third polishing pad sections 20, 22, 24 that are coupled with a steel belt 30. The phrase "coupled with," as used herein, means coupled either directly or indirectly via one or more intervening elements. The first and second polishing pad sections 20, 22 are welded together to form a first joint 32. The second and third polishing pad sections 22, 24 are welded together to form a second joint 34. The first and third polishing pad sections 20, 24 are welded together to form a third joint 36. Each of the polishing pad sections 20, 22, 24 can comprise one or more portions of a polishing material and/or one or more portions of a cushioning material. Also, while a pad having three sections is depicted, a pad can have more or less than three sections.

Figure 2:
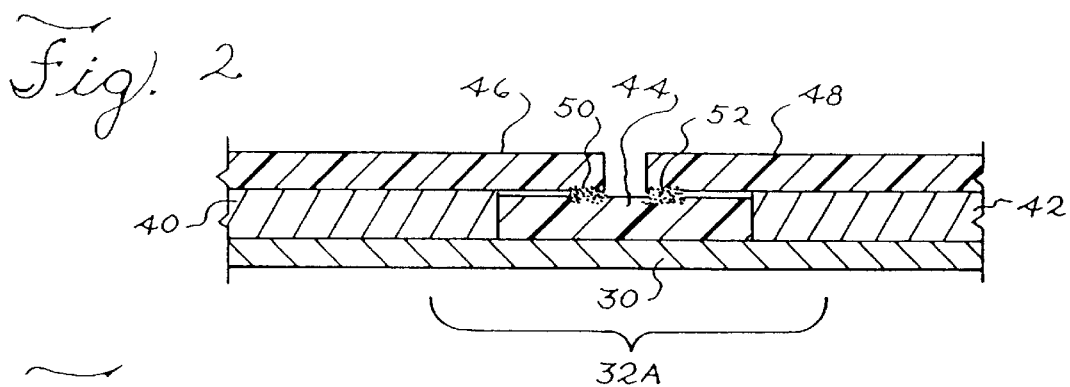
FIG. 2 is a side view of a portion of the polishing pad of FIG. 1.

Referring now to FIG. 2, a first preferred embodiment of the joint 32 used to joint the first and section sections 20, 22 is shown as 32A. The steel belt 30 serves as a support structure for the stacked pad. Any suitable steel belt can be used as a supporting structure in the present embodiments. First and second cushioning pad portions 40, 42 are coupled with the steel belt 30. The first and second cushioning pad portions 40, 42 preferably comprise a polyurethane felt material such as the 817 pad available from Thomas West. The cushioning pad portions 40, 42 typically include a laminate or glue on both the top and bottom surfaces. This enables the bottom surfaces of the cushioning pads 40, 42 to be easily coupled with the steel belt 30 and also enables another pad to be easily coupled with the top surfaces of cushioning pads 40, 42. In this embodiment, the cushioning pad portions 40, 42 are coupled with the steel belt through the use of the standard glue included on the pads. Alternatively, an additional or a different glue or laminate can be used with or substituted in place of the standard glue. The cushioning pad portions 40, 42 are arranged so that a first polishing pad portion 44 is positioned between the cushioning pad portions 40, 42.

The first polishing pad portion 44 is coupled with the steel belt 30 and the second and third polishing pad portions 46, 48 are coupled with the first polishing pad portion 44 and the first cushioning pad portion 40 and the second cushioning pad portion 42, respectively. The polishing pad portions 44, 46, 48 preferably comprise a polyurethane based material such as IC 1000 available from Rodel. Alternatively the polishing pad portions 44, 46, 48 can comprise any suitable polishing pad materials. The polishing pad portions 44, 46, 48 typically include a glue or laminate on the back side that is used to attach the polishing pad portions 44, 46, 48 to a supporting structure, such as a steel belt, or to another pad. In this embodiment, the standard glue is used to couple the first polishing pad portion 44 with the steel belt 30. The first polishing pad portion 44 is preferably positioned between the first and second cushioning pad portions 40, 42 such that a maximum of a 0.03 inch gap exists between the first polishing pad portion 44 and the first and second cushioning pad portions 40, 42. The gap between the first polishing pad portion 44 and the first and second cushioning pad portions 40, 42 can also be greater or less than 0.03 inches.

The second polishing pad portion 46 is coupled with the first cushioning pad portion 40 and the first polishing pad portion 44. The standard glue is used to attach a part of the second polishing pad portion 46 to the first cushioning pad portion 40. The standard glue is removed from the part of the second polishing pad portion 44 that is coupled with the first polishing pad portion 44. In place of the glue, the second polishing pad portion 46 is welded to the first polishing pad portion 44, as described in more detail below, to form a weld 50.

The third polishing pad portion 48 is attached to the second cushioning pad portion 42 and the first polishing pad portion 44. The standard glue is used to couple a part of the third polishing pad portion 48 to the second cushioning pad portion 42. The standard glue is removed from the part of the third polishing pad portion 48 that is coupled with the first polishing pad portion 44. In place of the glue, the third polishing pad portion 48 is welded to the first polishing pad portion 44, to form a weld 52. The second and third polishing pad portions 46, 48 are preferably positioned so that a gap is formed between the two portions. This gap is preferably between 0.12 and 0.25 inches wide.

Referring now to FIG. 3, the second and third polishing pad portions 46, 48 are preferably welded to the first polishing pad portion 44 by ultrasonic welding. In the ultrasonic welding process, high-frequency electrical energy is converted into high-frequency mechanical motion. The mechanical motion is transmitted to the pieces in the form of vibrations. The combination of the vibrations and applied force creates frictional heat at the mating surfaces of the pieces. This head causes the plastic material to melt thereby forming a molecular bond between the parts.

Before the polishing pad portions 44, 46, 48 can be welded together, the portions must be prepared for the welding process. The standard glue that is included on the backside of the portions must be removed from the sections of the second and third polishing pad portions 46, 48 that will be attached to the first polishing pad portion 44 (act 110, FIG. 3). The second polishing pad portion 46 is placed on top of both the first cushioning pad portion 40, and the first polishing pad portion 44 (act 120). The second polishing pad portion 46 should be positioned so that the section without the glue on the backside overlaps the first polishing pad portion 44. The overlapping sections of the first and second polishing pad portions 44, 46 are place in a support fixture (act 130). A horn, which is typically made from stainless steel or the like, is brought into contact with the top surface of the second polishing pad portion 46 (act 140). A controlled pressure is applied to the second polishing pad portion 46 (act 150), thereby clamping it and the first polishing pad portion 44 together against the fixture.

The horn is vibrated vertically for a predetermined amount of time (act 160). This time period is called the weld time. During the welding time, the horn moves in increments of thousandths of an inch (microns). The distance the horn moves is called the collapse distance. The frequency of the vibrations is preferably 20,000 cycles per second (20 kHz). However, the frequency can vary depending upon the material being welded and the type of weld desired. The mechanical vibrations are transmitted through the first and second polishing pad portions 44, 46 creating frictional heat between the portions at the points where the two sections meet.

When the temperature at the junction points of the first and second polishing pad portions 44, 46 reaches the melting point of the particular material that is used in the portions, the material melts and flows. The vibration is stopped at this time (act 170). The clamping force is maintained for a predetermined amount of time after the vibrations have stopped (act 180) to allow the parts to fuse as the melted material cools and solidifies. This period of time is known as the hold time. Once the melted material has solidified, the clamping force is removed (act 190) and the horn is retracted. The two polishing pad portions 44, 46 are joined by a weld and can be removed from the fixture as one part.

This process can be repeated multiple times to created additional welds between the first and second polishing pad portions 44, 46. The entire process can also be repeated to weld the first and third polishing pad portions 44, 48 together with one or more welds.

One suitable ultrasonic machine for welding the polishing pad portions 44, 46, 48 is the Branson Model 920IW. For example, to weld two 0.050 in thick portions of IC1000 polishing pad portions, the following setting should be used with the Branson Model 920IW. The air pressure should be set between 65 and 70 psi, the collapse mode should be set at 0.033", the hold time should be 2 seconds, and the trigger pressure should be set at 2.5 pounds.

Alternative methods of welding the polishing pad portions can be used in addition to or in place of the ultrasonic welding process described above. Virtually any form of welding that enables the material used in the polishing pad portions to be melted and fused can be used. For example, without limitation, inertia welding, fusion welding, hot gas welding, induction welding, dielectric welding, and solvent welding can all be used to weld the polishing pad portion.

Inertia welding utilizes kinetic energy of a flywheel that is converted to heat energy by friction between the sections. One section is fixed while the other is clamped in a spindle chuck. The flywheel to which the movable part is attached is accelerated and at a predetermined speed, driving power is cut and the two parts are forced together. Fusion welding involves plasticizing or melting the edges of the pieces being welded by placing them in contact with a heating platen. Once the edges are plasticized and a proper melt depth is reached, the heating platen is removed and the two edges are forced together. As the parts cool, the edges are welded together.

Hot gas welding involves heating the pieces to be joined and a thermoplastic rod through the use of an inert gas. When the parts and the rod reach a temperature at which they can be pushed together, the heat source is removed and the parts are held in place while they cool. As the parts cool, the pieces are welded together. Induction welding involves pressing the pieces that are to be welded together around a metal insert. The pieces and the metal are then passed through a magnetic field. When the pieces and the metal are passed through the magnetic field, the metal is heated and the pressure produces a fusion weld. The metal remains sealed inside the parts.

Dielectric welding involves breaking down the plastic under high voltages and frequencies that produce heating. The heating causes the plastic to melt and the parts are welded together. Solvent welding involves coating the pieces that are to be welding with a solvent that softens them. When they are soft enough, the pieces are forced together. The plastic molecules from the two parts mix together and, as the solvent evaporates, the parts are welded together.

Figure 4:
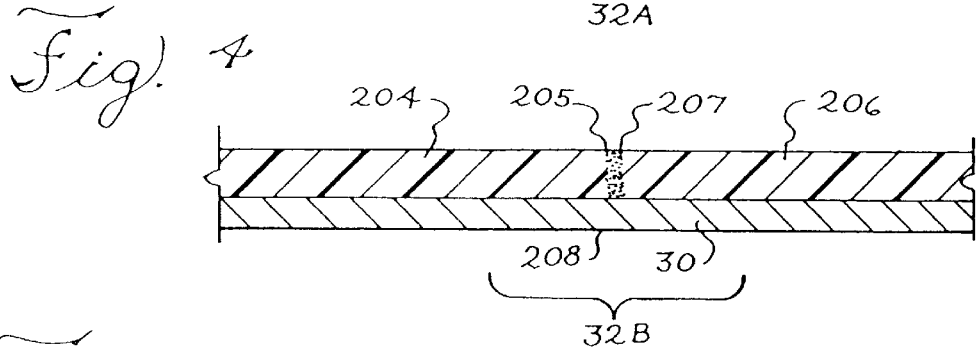
FIG. 4 is a side view of a portion of a polishing pad of a third preferred embodiment.

Referring now to FIG. 4, an alternative configuration for the joint 32 of the sections of the polishing pad 20, 22 of FIG. 1 is shown as 32B. In this embodiment, first and second polishing pad portions 204, 206 are coupled with a steel belt 30. The ends 205, 207 of the first and second polishing pad portions 204, 206 are butted against each other. The butted ends 205, 207 are welded together to form a weld 208. Any of the above methods of welding can be used to weld the two portions together.

Figure 5:
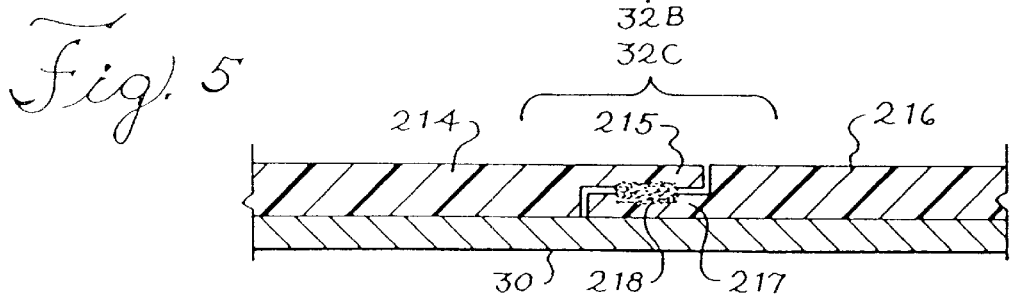
FIG. 5 is a side view of a portion of a polishing pad of a fourth preferred embodiment.

Referring now to FIG. 5, an alternative configuration for the joint 32 of the sections of the polishing pad 20, 22 of FIG. 1 is shown as 32C. In this embodiment, first and second polishing pad portions 214, 216 are coupled with a steel belt 30. The first and second polishing pad portions 214, 216 are fashioned such that a tongue 215, 217 extends outwardly from the end of both the first and second polishing pad portions 214, 216. The tongues 215, 217 overlap each other and are welded together to form a weld 218. Any of the above methods of welding can be used to weld the two portions together.

Figure 6:
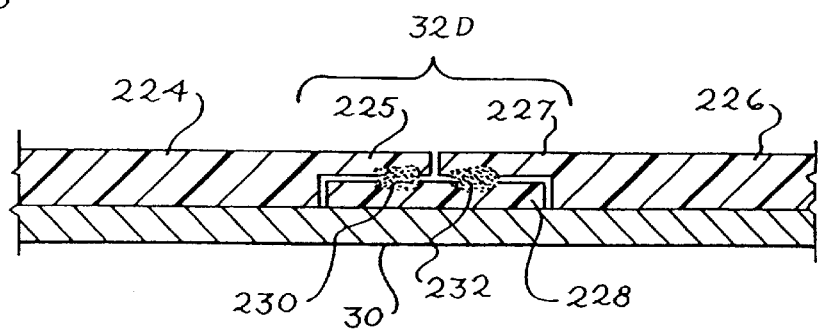
FIG. 6 is top view of a portion of a polishing pad of a fifth preferred embodiment.

Referring now to FIG. 6, an alternative configuration for the joint 32 the sections of the polishing pad 20, 22 of FIG. 1 is shown as 32D. In this embodiment, first and second polishing pad portions 224, 226 are coupled with a steel belt 30. A filler portion 228 is coupled with the steel belt 30 and is positioned between the first and second polishing pad portions 224, 226. The filler portion 228 preferably comprises the same material as the polishing pad portions 224, 226, but can comprise any suitable material. The first and second polishing pad portions 224, 226 are fashioned such that a tongue 225, 227 extends outwardly from the end of both the first and second polishing pad portions a 224, 226. The tongues 225, 227 each overlap the filler portion 228 and are welded to the filler portion 228 to form welds 230, 232. Any of the above methods of welding can be used to weld the two portions together.

Figure 7:
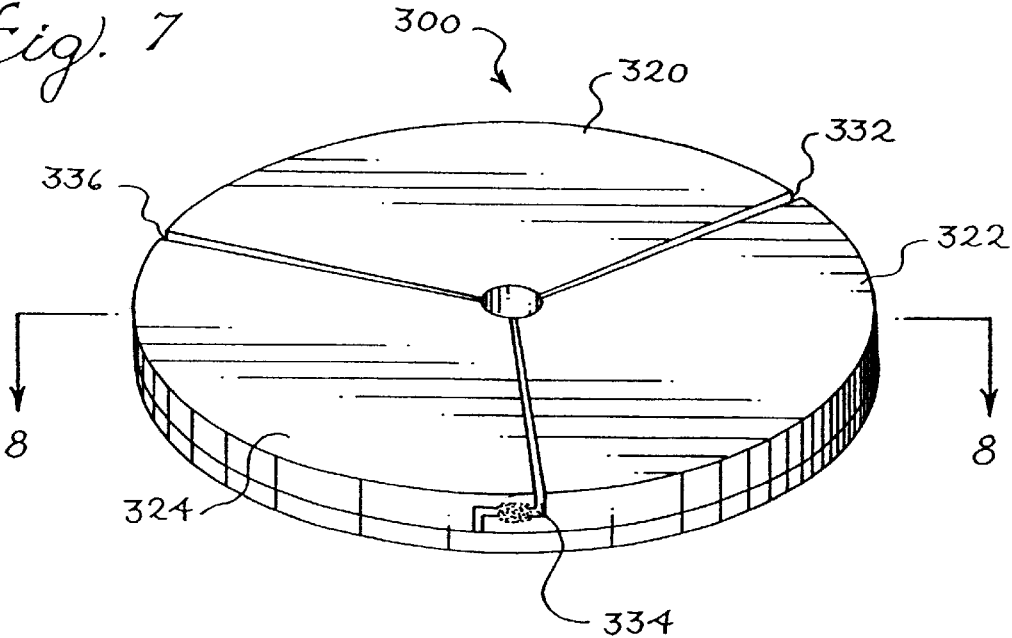
FIG. 7 is a side view of a portion of the polishing pad of FIG. 6.
Figure 8:
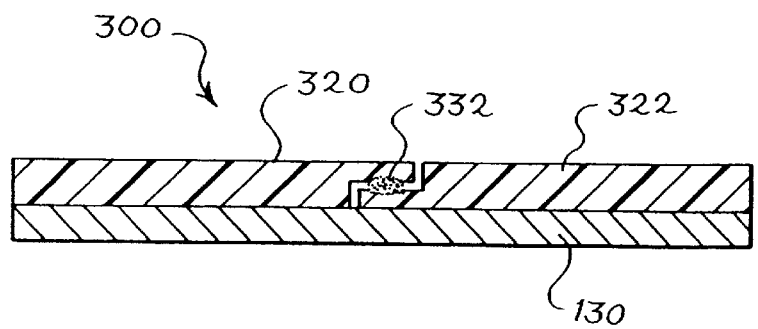
FIG. 8 is a flow chart of a method of joining polishing pad portions of a first preferred embodiment.

Referring now to FIGS. 7 and 8, a rotary type polishing pad 300 of a preferred embodiment is shown. The polishing pad 300 first, second, and third polishing pad sections 320, 322, 324 that are coupled with a rotary table 330. The first and second polishing pad sections 320, 322 are welded together to form a first joint 332. The second and third polishing pad sections 322, 324 are welded together to form a second joint 334. The first and third polishing pad sections 320, 324 are welded together to form a third joint 336. Each of the polishing pad sections 320, 322, 324 can comprise portions of a polishing pad and can also comprise portions of a cushioning pad as described below. While the polishing pad 300 is depicted as having three sections, more or less than three sections can be used in the pad. Any of the configurations depicted above in FIGS. 2 and 4–6 can be used to join the sections. Also, any of the above methods of welding can be used to weld the two portions together.

The resulting portion of the polishing pad includes welded joints that are resistant to slurry infiltration and is more robust than a standard laminated joint. Accordingly the life of the polishing pad is increased.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

I claim:

1. A method of joining a first section of polishing pad for use in chemical mechanical planarization of a semiconductor wafer with a second section of polishing pad for use in chemical mechanical planarization of a semiconductor wafer, the method comprising:

(a) positioning the first section of polishing pad such that a part of the first section of polishing pad overlaps a part of the second section of polishing pad; and (b) welding the first section of polishing pad to the second section of polishing pad.

2. The invention of claim 1, wherein (b) comprises welding the first and second sections by ultrasonic welding.

3. The invention of claim 1, wherein (b) comprises welding the first and second sections by inertia welding.

4. The invention of claim 1, wherein (b) comprises welding the first and second sections by vibration welding.

5. The invention of claim 1, wherein (b) comprises welding the first and second sections by fusion welding.

6. The invention of claim 1, wherein (b) comprises welding the first and second sections by hot gas welding.

7. The invention of claim 1, wherein (b) comprises welding the first and second sections by dielectric welding.

8. The invention of claim 1, wherein (b) comprises welding the first and second sections by induction welding.

9. A polishing pad for use in chemical mechanical planarization of a semiconductor wafer, the polishing pad comprising:

a first section of polishing pad; and a second section of polishing pad welded to the first section of polishing pad, wherein the first section of polishing pad comprises a polishing pad portion and a cushioning pad portion, and wherein the second section of polishing pad is selected from the group consisting of polishing material and cushioning material.

10. A polishing pad for use in chemical mechanical planarization of a semiconductor wafer, the polishing pad comprising:

a first section of polishing pad; and a second section of polishing pad welded to the first section of polishing pad, wherein the second section of polishing pad comprises a polishing pad portion and a cushioning pad portion, and wherein the first section of polishing pad is selected from the group consisting of polishing material and cushioning material.

* * * * *